United States Patent [19]

Togawa

[11] Patent Number: 5,094,477
[45] Date of Patent: Mar. 10, 1992

[54] AIRBAG RESTRAINT SYSTEM
[75] Inventor: Tatsuo Togawa, Kanagawa, Japan
[73] Assignee: Ikeda Bussan Co., Ltd., Ayase, Japan
[21] Appl. No.: 628,356
[22] Filed: Dec. 17, 1990
[30] Foreign Application Priority Data
  Dec. 27, 1989 [JP] Japan ................. 1-339383
[51] Int. Cl.$^5$ .............................. B60R 21/20
[52] U.S. Cl. ................... 280/743; 280/728
[58] Field of Search ........... 280/729, 731, 728, 742, 280/737, 736, 740, 741, 743

[56] References Cited

U.S. PATENT DOCUMENTS 5,011,183  4/1991  Thornton et al. ............ 280/743

FOREIGN PATENT DOCUMENTS

| | | |
|---|---|---|
| 2944319 | 5/1981 | Fed. Rep. of Germany ...... 280/743 |
| 3818185 | 8/1989 | Fed. Rep. of Germany ...... 280/743 |
| 54-2521 | 2/1979 | Japan . |
| 56-43890 | 10/1981 | Japan . |
| 61-185642 | 11/1986 | Japan . |
| 0254446 | 10/1989 | Japan ......................... 280/728 |

Primary Examiner—Kenneth R. Rice
Assistant Examiner—Paul Dickson
Attorney, Agent, or Firm—Foley & Lardner

[57] ABSTRACT

An airbag restraint system for protecting a vehicle passenger in the event of a serious vehicle collision. The airbag restraint system includes a bag-shaped section which is supplied with high pressure gas generated by a gas generator. The bag-shaped section is formed by being integrally woven under a pattern weaving and includes a doubly woven main part having front and rear side woven cloth members which are separate from each other to define a chamber to be supplied with the high pressure gas. A singly woven outer peripheral part is formed around the doubly woven main part and has an outer peripheral woven cloth member which is integral with the front and rear side woven cloth members of the doubly woven main part. The doubly woven main part and the singly woven outer peripheral part are continuously and integrally woven, thereby reducing the number of component parts of the airbag while facilitating production of the airbag.

12 Claims, 3 Drawing Sheets

AIRBAG RESTRAINT SYSTEM

BACKGROUND OF THE INVENTION

1. Field of the Invention

This invention relates to improvements in an airbag restraint system for protecting a vehicle passenger in a vehicle serious collision, and more particularly to an airbag which is formed integrally by weaving without a sewing operation.

2. Description of the Prior Art

A variety of airbag restraint systems for automotive vehicles have hitherto been proposed and put into practical use in order to protect a vehicle passenger in the event of a vehicle serious collision or the like. Such airbag restraint systems are disclosed, for example, in Japanese Patent Publication No. 56-43890, Japanese Utility Model Publication No. 54-2521 and Japanese Utility Model Provisional, Publication No. 61-185642.

These airbag restraint systems are usually arranged as set forth below. The airbag restraint system includes an airbag which is momentarily inflated upon being filled with high pressure gas from a gas generator in the event of a serious collision or the like. The airbag is usually constituted of circular front and rear side sheet members which are formed of cloth material. The front and rear side sheet members are sewed at their peripheral portions with each other thereby to be formed into the bag-shape. The rear side sheet member is formed at its central part with a gas inlet through which gas from the gas generator is supplied into the airbag.

Additionally, the airbag is provided therein with a plurality of suspension belts for the purpose of preventing the airbag from directionally inflating or from projecting generally in one direction or toward the vehicle passenger during inflation of the airbag upon being supplied with the gas. Each suspension belt is sewed at its one end section with the inner surface of the front side sheet member, and at the other end section thereof with the inner surface of the rear side sheet member to form an installation section. This installation section is tightly held between a retainer and a base plate, which is fixedly secured to a vehicle stationary member, such as an instrument panel or a steering wheel.

However, drawbacks have been encountered in such a conventional airbag restraint system, as discussed hereinafter. The front and rear side sheet members are usually formed by circularly punching an original sheet material. The original sheet material is prepared by coating a plain weave fabric with a synthetic resin layer. Then, the thus obtained circular front and rear side sheet members are sewed to each other at their outer peripheral sections with each other to become bag-shaped. During sewing, sewing machine needles will injure fibers of weaving yarns of the plain weave fabric and cause the weaving yarns to be broken. This leads to a possibility that the joining strength between the front and rear side sheet members are lowered. Additionally, a sewing operation makes it difficult to obtain a uniform airbag shape in manufacturing airbags, while being complicated and troublesome, thereby to raise the production cost of the airbag.

SUMMARY OF THE INVENTION

An object of the present invention is to provide an improved airbag restraint system including an airbag which is very safe and economical.

Another object of the present invention is to provide an improved airbag restraint system, including an airbag high in strength and small in the number of component parts.

A further object of the present invention is to provide an improved airbag restraint system, including an airbag whose bag-shaped section is formed integrally by a weaving operation without employing a sewing operation of the front and rear side sheet members constituting the bag-shaped section.

An airbag restraint system of the present invention is comprised of an airbag fluidly connected with a gas generator, and adapted to be supplied with gas from the gas generator. The airbag includes a bag-shaped section, which includes a doubly woven main part. The doubly woven main part has front and rear woven cloth members which are separable from each other to define therebetween a chamber to be supplied with gas from the gas generator. A singly woven outer peripheral part is formed around the doubly woven main part and has an outer peripheral woven cloth member which is integral with the front and rear side woven cloth members so that the weaving yarns of the outer peripheral woven cloth member are integral with those of the front and rear side woven cloth members of the doubly woven main part. The doubly woven main part and the singly woven outer peripheral part are continuous and integrally woven.

Accordingly, since the main part and the outer peripheral parts of the bag-shaped section are integrally woven, for example, by a pattern weaving, it is not required to join component sheet parts with each other by sewing, thereby reducing the number of the component parts and omitting a troublesome sewing operation. Additionally, the integrally weaving the bag-shaped section provides the airbag bag-shaped section which is high in strength and of a uniform shape in manufacturing.

BRIEF DESCRIPTION OF THE DRAWINGS

In the drawings, the same reference numerals designate the same parts and elements throughout all the figures, in which.

DETAILED DESCRIPTION OF THE INVENTION

Referring to FIGS. 1 to 4, there is shown an embodiment of an airbag restraint system in accordance with the present invention. The airbag restraint system of this embodiment is for an automotive vehicle and comprises an airbag 12. The airbag 12 is designed to momentarily inflate in the event of a serious collision in order to provide a soft cushion for a vehicle passenger. Inflation of the airbag 12 is carried out when the airbag 12 is supplied with high pressure gas generated from a gas generator 2. The gas generator 2 is arranged to generate high pressure gas to be supplied into the airbag 12 at a predetermined condition or a serious collision.

Figure 2:
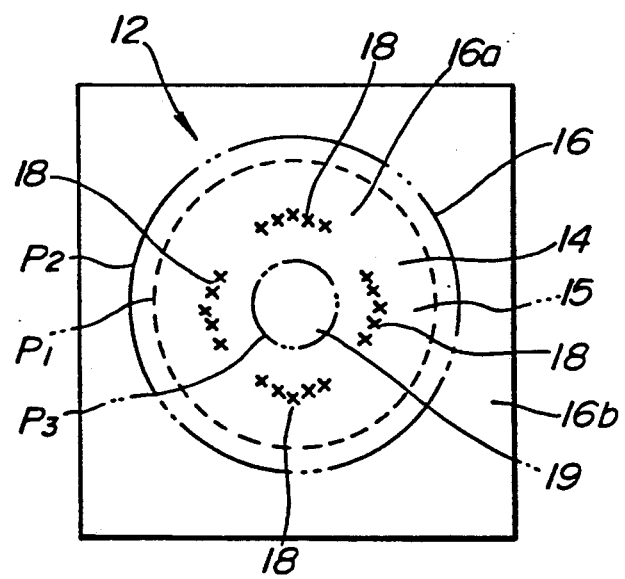
FIG. 2 is a front elevation of a bag-shaped section of the airbag of FIG. 1, but shows an incomplete product at a step during a production process thereof.

The airbag 12 includes a bag-shaped section 16 which is constituted of front and rear side sheet or cloth members 14, 15 which are formed generally circular. In this embodiment, the front and rear side sheet members 14, 15 are formed respectively of woven cloths and woven integrally with each other by a known pattern weaving and by using a pattern weaving machine such as a Jacguard machine. The bag-shaped section 16 is formed in such a manner that a main part 16a thereof is doubly woven to form the front and rear side sheet members 14, 15 while an outer peripheral part 16b thereof is singly woven to form a sheet of woven cloth. It will be understood that the main part 16a and the peripheral part 16b are integral with each other with weaving yarns. In production, a plurality of such bag-shaped sections 16 are continuously and integrally formed to obtain a long woven cloth (not shown). Then, the long woven cloth is cut laterally to obtain a square woven cloth containing the bag-shaped section 16 as shown in FIG. 2.

The main part 16a is formed in parts thereof with singly woven portions 18 at which the doubly woven front and rear side sheet members 14, 15 are joined with each other. The singly woven portions 18 are formed separate from each other and generally along an imaginary circle (not shown) which is concentric with the circular front and rear side sheet members 14, 15. In this embodiment, each singly woven portion 18 is formed generally arcuate. The singly woven portions 18 prevent the airbag 10 from directionally inflating toward the vehicle passenger when supplied with the gas from the gas generator 2.

Figure 3:
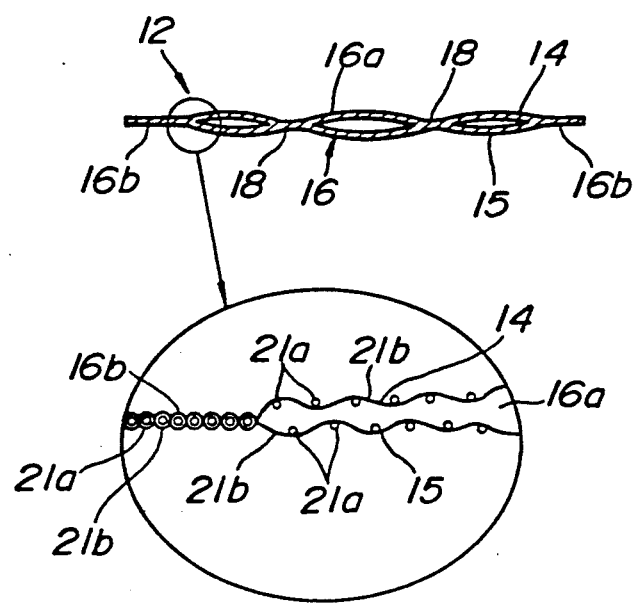
FIG. 3 is a cross-sectional view of the airbag bag-shaped section of FIG. 2 before inflation, including a fragmentary enlarged view of a part of the bag-shaped section.

As shown in FIG. 3, the outer peripheral portion 16b or the singly woven portion 18 is singly woven to be formed into a sheet of woven cloth by using warp yarns 21a and weft yarns 21b. The outer peripheral portion 16b and the singly woven portion 18 are integral and continuous with the major part 16a which is doubly woven to be formed into two sheets of woven cloths by using the warp yarns 21a and the weft yarns 21b. These two sheets of woven cloths 14, 15 are for example woven by alternatively shifting the warp yarns 21a as shown in FIG. 3.

Figure 1:
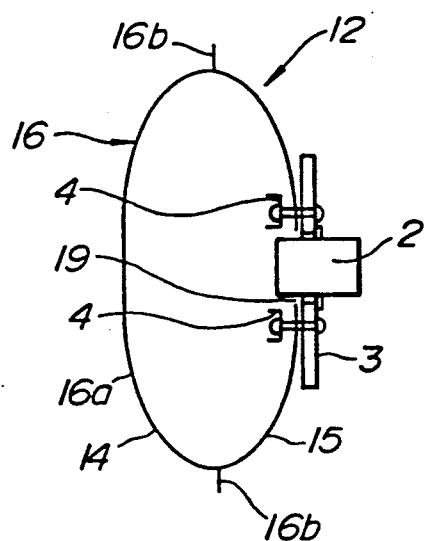
FIG. 1 is a schematic sectional view of an airbag of an embodiment of an airbag restraint system in accordance with the present invention.

As shown in FIG. 1, the inner peripheral portion of the rear side sheet member 15 is fixedly secured to a base member 3, which is fixedly supported to a stationary member such as an instrument panel or a steering wheel of the vehicle though not shown. More specifically, the rear side sheet member inner peripheral portion is put between the base plane 3 and a retainer 4 and fixed in position by means of pins (no numerals) for connecting the base plate 3 and the retainer 4. The pins pass through the retainer 4, the inner peripheral portion of the rear side sheet member 15 and the base plate 3.

In production, the square woven cloth as shown in FIG. 2 which has been obtained by the pattern weaving is cut into the circular shape along an imaginary circle $P_2$ which is slightly outside a border circle $P_1$ between the doubly woven major part 16a and the singly woven outer peripheral part 16b. Next, a central part of the rear side sheet member 15 is cut along an imaginary circle $P_3$ to form a gas inlet 19 through which the gas from the gas generator is supplied into the bag-shaped section 16. It is to be noted that the singly woven portions 18 in the main part 16a are woven with few yarns and formed lower in strength, so that the yarns in the singly woven portions 18 are broken when an internal pressure of the airbag 12 exceeds a predetermined level.

The front and/or rear side sheet members 14, 15 may be coated with a flame-resistant synthetic resin layer in order to improve a gas tight seal. Otherwise, a flame-resistant synthetic resin film may be applied to the front and/or rear side sheet members 14, 15. Furthermore, in order to improve the strength of the airbag 12, a sewing line (not shown) may be formed along the border circle $P_1$ between the doubly woven major part 16a and the singly woven outer peripheral portion 16b, and along an imaginary circle (not shown) between the border circle $P_1$ and the imaginary or cutting circle $P_2$. Such sewing can be readily made without causing a locational shift or the like of the sewing line because of the front and rear side sheet members 14, 15 are formed integral with each other. Moreover, a woven portion along the border circle $P_1$ may be formed higher in weaving density or the number of the warp and weft yarns in order to improve a rigidity of the airbag 12. In this case, a plurality of the similar high weaving density woven portions may be formed outside the boarder circle $P_1$.

Figure 4:
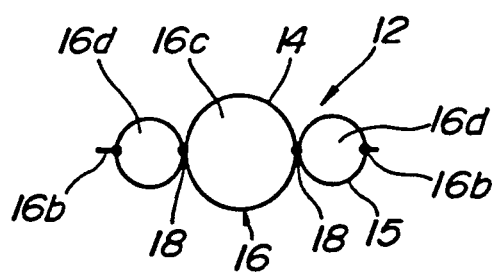
FIG. 4 is an explanatory cross-sectional view of the airbag bag-shaped section of FIG. 2 after an initial inflation upon being supplied with high pressure gas from a gas generator.

With the thus arranged airbag 12, when the airbag 12 momentarily inflates upon being supplied with high pressure gas from the gas generator 2 at a predetermined condition in a serious collision, the doubly woven front and rear side sheet members 14, 15 are moved to project in directions away from each other. However, projection of the sheet members 14, 15 is suppressed by virtue of the singly woven portions 18 formed in the main part 16a. Since the singly woven portions 18 are formed separate from each other, a plurality of projected or expanded portions 16c, 16d are formed inside and outside of the singly sewed portions 18 as shown in FIG. 4. When the internal pressure of the airbag 12 exceeds the predetermined level, the weaving yarns of the singly woven portions 18, which are low in strength, are broken, so that the airbag 12 is expanded into the shape of FIG. 1 to effectively provide a soft cushion to effectively protect the vehicle passenger in the vehicle serious collision.

Figure 5:
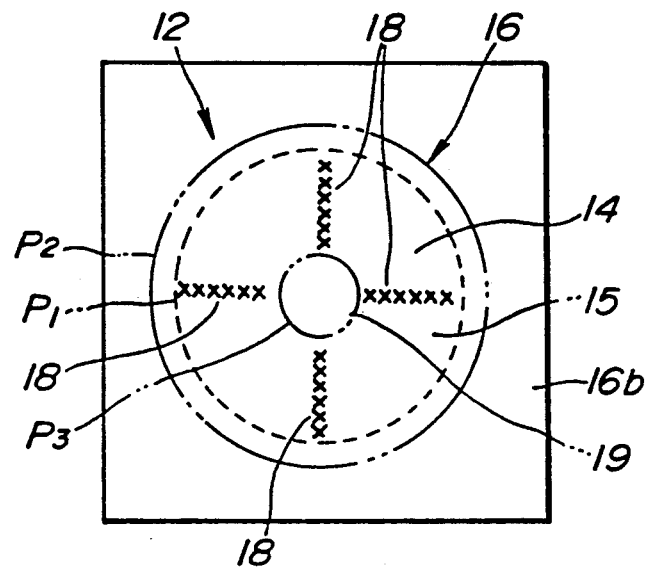
FIG. 5 is a front elevation similar to FIG. 2 but showing another example of airbag bag-shaped section of the airbag restraint system in accordance with the present invention.
Figure 6:
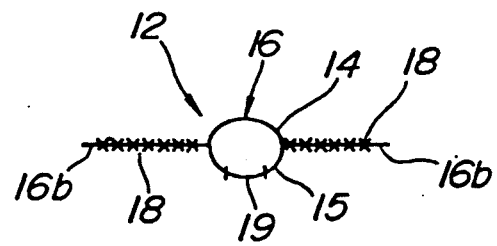
FIG. 6 is a sectional view of the airbag bag-shaped section of FIG. 5 after an initial inflation, upon being supplied with high pressure gas from a gas generator.

FIG. 5 to 6 illustrate another example of the airbag 12 of the airbag restraint system in accordance with the present invention, which is similar to the airbag of FIGS. 1 to 4 with the exception with each of the four singly woven portions 18 formed in the main part 16a of the bag-shaped section 16 extends straightly and radially outwardly. In this embodiment, each singly woven portion 18 extends from the gas inlet 19 of the rear side sheet member 15 to the border circle $P_1$ between the main part 16a and the outer peripheral part 16b.

Figure 7:
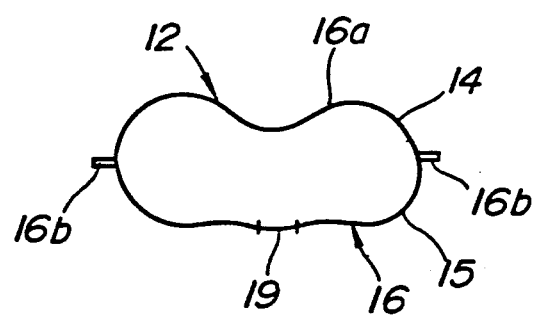
FIG. 7 is another sectional view of the airbag bag-shaped section of FIG. 5, upon complete inflation where yarns of singly woven portions are broken.

With this arrangement, during inflation of the airbag 12 upon being supplied with high pressure gas from the gas generator, the straight singly woven portions 18 which extends radially and outwardly do not obstruct the flow of the high pressure gas from the gas inlet 19 toward the outer peripheral part 16b of the bag-shaped section 16. Accordingly, at the initial period of inflation of the airbag 12, the central part of the bag-shaped section 16 expands as shown in FIG. 6. Then, when the internal pressure of the bag-shaped section 16 exceeds the predetermined level, the weaving yarns of the singly woven portions 18 which are low in strength are broken and therefore the bag-shaped section 16 expands into an intended bag-shape as shown in FIG. 7.

While the singly woven portions 18 have been described as being formed integrally with the bag-shaped section 16 during the pattern weaving, it will be understood that they may be formed by a sewing operation after the bag-shaped section 16 is woven. Furthermore, a part of weaving yarns of each singly woven portion 18 may be such formed as not to be broken so that only the remaining yarns are broken even when the internal pressure of the airbag 12 exceeds the predetermined level.

As appreciated from the above, according to the embodiments of the present invention, the front and rear side sheet members are woven integrally with each other by using a pattern weaving, and therefore a sewing operation to join the front and rear side sheet members is not required. Additionally, such an integral weaving method provides airbags which are of a uniform shape and high in strength (in joining strength between the front and rear side sheet members), improving the quality of the airbags. Additionally, the airbag produced by the integrally weaving method is reduced in the number of component parts and facilitated in production, thereby exhibiting economical advantages. Furthermore, since the airbag is formed with the singly woven portion for partly joining the front and rear side sheet members, it is prevented from a directional inflation toward the vehicle passenger thereby to protect the vehicle passenger from being directly struck with the expended front side sheet member, without using conventional suspension belts disposed inside the airbag to connect the front and rear side sheet members. This secures safety of the airbag. Additionally, the airbag is so formed that the weaving yarns of the singly woven portion joining the front and rear side members can be broken when an internal pressure of the airbag exceeds a predetermined level, so that the airbag inflates to provide a soft cushion of the bag-shape thus to effectively protect the vehicle passenger.

What is claimed is:

1. An airbag restraint system comprising
an airbag fluidly connected with a gas generator and adapted to be supplied with gas from the gas generator, said airbag including
a bag-shaped section including a doubly woven main part having first and second woven cloth members which are separable from each other to define therebetween a chamber to be supplied with gas from the gas generator, a singly woven outer peripheral part formed around said doubly woven main part and having a third woven cloth member which is integral with said first and second woven cloth members so that weaving yarns of said third woven cloth member are integral with those of said first and second woven cloth members of said doubly woven main part, said doubly woven main part and said singly woven outer peripheral part being continuously and integrally woven, and at least one linear singly woven portion forming at least a part of said doubly woven main part, said first and second woven cloth members being joined with each other and said singly woven portion.

2. An airbag restraint system as claimed in claim 1, wherein said bag-shaped section is woven by pattern weaving.

3. An airbag restraint system as claimed in claim 1, wherein each of said first and second woven cloth members is generally circular.

4. An airbag restraint system as claimed in claim 1, wherein said at least one singly woven portion is formed such that weaving yarns thereof are breakable when an internal pressure of said airbag exceeds a predetermined level upon being supplied with gas from the gas generator.

5. An airbag restraint system as claimed in claim 1, wherein said first woven cloth is formed at its central part with an opening through which the gas from the gas generator is supplied into said chamber.

6. An airbag restraint system as claimed in claim 5, wherein said singly woven portion includes a plurality of said linear singly woven portions which are separate from each other.

7. An airbag restraint system as claimed in claim 6, wherein said linear singly woven portions are formed along a circle which is generally concentrical with the circular first and second woven cloth members.

8. An airbag restraint system as claimed in claim 6, wherein each of said linear singly woven portions extends generally straightly and radially outwardly.

9. An airbag restraint system as claimed in claim 8, wherein each of said linear singly woven portions extends from an inner periphery of said first woven cloth member defining said opening to an outer periphery of said first woven cloth member.

10. An airbag restraint system as claimed in claim 9, further comprising a base member to be fixed to a stationary member of a vehicle, in which an inner peripheral portion of said first woven cloth is secured to said base member.

11. An airbag restraint system as claimed in claim 10, wherein s id gas generator has a gas ejection opening to eject gas so that the gas strikes against the inner surface of said second woven cloth.

12. An airbag restraint system comprising:
an airbag fluidly connected with a gas generator and adapted to be supplied with gas from the gas generator, said airbag including:
a bag-shaped section, including;
a doubly woven main part having first and second woven cloth members which are separable from each other to define therebetween a chamber to be supplied with gas from the gas generator, each of said first and second woven cloth members being generally circular so that said doubly woven main part is generally circular, said first woven cloth member being formed at its central part with an opening through which the gas from the gas generator is supplied to said chamber,
a singly woven outer peripheral part formed around said doubly woven main part and having a third woven cloth member which is integral with said first and second woven cloth members so that weaving yarns of said third woven cloth members are integral with those of said first and second woven cloth members of said doubly woven main part, said third woven cloth member being generally annular so that said singly woven outer peripheral part is generally annular, said doubly woven main part and said singly woven outer peripheral part being continuously and integrally woven, and a plurality of linear singly woven portions formed at said doubly woven main part and separate from each other, said first and second woven cloth members being joined with each other by means of said singly woven portions, said singly woven portions being located around said opening of said first woven cloth member and arranged generally regularly in a peripheral direction of said doubly woven main part, said singly woven portions being spaced generally equidistant in the peripheral direction from each other.

* * * * *